United States Patent
Huang et al.

(10) Patent No.: US 7,684,123 B2
(45) Date of Patent: Mar. 23, 2010

(54) LENS STRUCTURE

(75) Inventors: Chun-Ru Huang, Taipei (TW); Chien-Yueh Chen, Taipei (TW)

(73) Assignee: AV TECH Corporation, Taipei County (TW)

( * ) Notice: Subject to any disclaimer, the term of this patent is extended or adjusted under 35 U.S.C. 154(b) by 0 days.

(21) Appl. No.: 12/251,432

(22) Filed: Oct. 14, 2008

(65) Prior Publication Data
US 2009/0257138 A1 Oct. 15, 2009

(30) Foreign Application Priority Data
Apr. 14, 2008 (TW) ............................... 97113490 A

(51) Int. Cl.
G02B 15/14 (2006.01)
G02B 7/02 (2006.01)

(52) U.S. Cl. ................... 359/699; 359/700; 359/823

(58) Field of Classification Search ......... 359/694–703, 359/819–824; 396/72, 79, 85
See application file for complete search history.

(56) References Cited

U.S. PATENT DOCUMENTS 5,765,048 A * 6/1998 Nomura et al. ............... 396/72
6,765,728 B2 * 7/2004 Kabe .......................... 359/699

* cited by examiner

Primary Examiner—Mohammed Hasan
(74) Attorney, Agent, or Firm—Jianq Chyun IP Office

(57) ABSTRACT

A lens structure includes a first barrel, a second barrel, a third barrel, a first lens module and a second lens module. The first and the second barrel respectively have a first guiding-groove and a second guiding-groove. The third barrel has a first portion and a second portion. The first and the second portion respectively have a plurality of third guiding-grooves and a plurality of fourth guiding-grooves. The first and the second guiding-groove encircle the first and the second portion, respectively. The first and the second lens module respectively have a plurality of first guiding-portions and a plurality of second guiding-portions. The first guiding-portions are disposed in sliding way in the corresponding third guiding-groove and connected in helically sliding way into the first guiding-groove. The second guiding-portions are disposed in sliding way in the corresponding fourth guiding-groove and through the second guiding-groove.

10 Claims, 3 Drawing Sheets

LENS STRUCTURE

CROSS-REFERENCE TO RELATED APPLICATION

This application claims the priority benefit of Taiwan application serial no. 97113490, filed on Apr. 14, 2008. The entirety of the above-mentioned patent application is hereby incorporated by reference herein and made a part of specification.

BACKGROUND OF THE INVENTION

1. Field of the Invention

The present invention generally relates to an optical device, and more particularly, to a lens structure.

2. Description of Related Art

Along with the progress of modern video technology, image apparatuses, such as digital video recorder (DV) and digital camera (DC), have been broadly used by people today. One of the kernel components in the image apparatuses is zoom lens, by adjusting which a sharp image can be focused on a charge coupled device (CCD) for imaging. Obviously, the optical quality of the zoom lens is closely bound of the image quality.

A common zoom lens includes a front cell and a rear cell, wherein the front cell usually is for focusing and the rear cell is for zooming. When the lens is zooming and focusing, driving devices are used to drive the front cell and the rear cell. That is, the front cell is in charge of adjusting focal length to make an image sharp; the rear cell is in charge of adjusting magnification to zoom in or zoom out the image; and operations of the front cell and the rear cell are independent. Specially, when the rear cell reaches a preset position by manually adjusting or using a drive motor or a gear transmission module, the front cell then reaches another preset position by manually adjusting or using another drive motor or another gear transmission module. In this way, the magnification adjustment and the focusing are implemented.

Note that since a conventional zoom lens requires different driving devices for zooming and focusing, therefore, it takes more time to adjust a conventional front cell and a rear cell to correct positions, which leads to a poor focusing efficiency. Besides, the required two sets of driving devices for driving the front cell and the rear cell bring a higher product cost with a conventional zoom lens.

SUMMARY OF THE INVENTION

Accordingly, the present invention is directed to a lens structure with better focusing efficiency and lower product cost.

The present invention provides a lens structure, which includes a first barrel, a second barrel, a third barrel, a first lens module and a second lens module. A first guiding-groove is disposed on the first barrel, the second barrel is connected to the first barrel and a second guiding-groove is disposed on the second barrel. The third barrel is disposed through the combination of the first barrel and the second barrel along an assembling axis, and the third barrel has a first portion and a second portion, wherein a plurality of third guiding-grooves and a plurality of fourth guiding-grooves are respectively disposed on the first portion and the second portion and parallel to the assembling axis. The first guiding-groove and the second guiding-groove respectively encircle the first portion and the second portion about the assembling axis.

The first lens module is disposed through the first portion along the assembling axis and has a plurality of first guiding-portions. The first guiding-portions are disposed in sliding way in the corresponding third guiding-grooves and connected in helically sliding way into the first guiding-groove. The second lens module is disposed through the second portion along the assembling axis and has a plurality of second guiding-portions. The second guiding-portions are disposed in sliding way in the corresponding fourth guiding-grooves and through the second guiding-groove. When the combination of the first barrel and the second barrel rotates about the assembling axis, the matches between the first guiding-groove and the first guiding-portions and between the third guiding-grooves and the first guiding-portions would move the first lens module along the assembling axis, and the matches between the second guiding-groove and the second guiding-portions and between the fourth guiding-grooves and the second guiding-portions would move the second lens module along the assembling axis.

In an embodiment of the present invention, the first lens module further includes a first lens barrel and a first set of lenses, wherein the first set of lenses is disposed in the first lens barrel and the first guiding-portions are disposed on the outer surface of the first lens barrel.

In an embodiment of the present invention, the second lens module further includes a second lens barrel and a second set of lenses, wherein the second set of lenses is disposed in the second lens barrel and the second guiding-portions are disposed on the outer surface of the second lens barrel.

In an embodiment of the present invention, the first guiding-groove is a helical guiding-groove disposed on the inner surface of the first barrel.

In an embodiment of the present invention, the second guiding-groove is a step guiding-groove.

In an embodiment of the present invention, the third guiding-groove and the fourth guiding-groove are linear guiding-grooves.

In an embodiment of the present invention, when the combination of the first barrel and the second barrel rotates about the assembling axis, the first guiding-groove would make the first guiding-portions slide along the assembling axis in the third guiding-grooves and make the second guiding-portions slide along the assembling axis in the fourth guiding-grooves.

In an embodiment of the present invention, the second guiding-groove has a plurality of stepping sections. When the second barrel rotates about the assembling axis, the second guiding-portion moveable within one of the stepping sections does not slide in the corresponding fourth guiding-groove, but the second guiding-portion moving from a stepping section to another adjacent stepping section slides in the corresponding fourth guiding-groove.

In an embodiment of the present invention, the first barrel and the second barrel are formed in a single unit.

By the engagements between the first barrel, the second barrel and the third barrel, the present invention enables the first lens module and the second lens module to be adjusted to reach a correct focusing position through a driving device. In comparison with the prior art where two sets of driving devices are used to drive the first lens module and the second lens module, the lens structure provided by the present invention has better focusing efficiency and lower product cost.

BRIEF DESCRIPTION OF THE DRAWINGS

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1A:
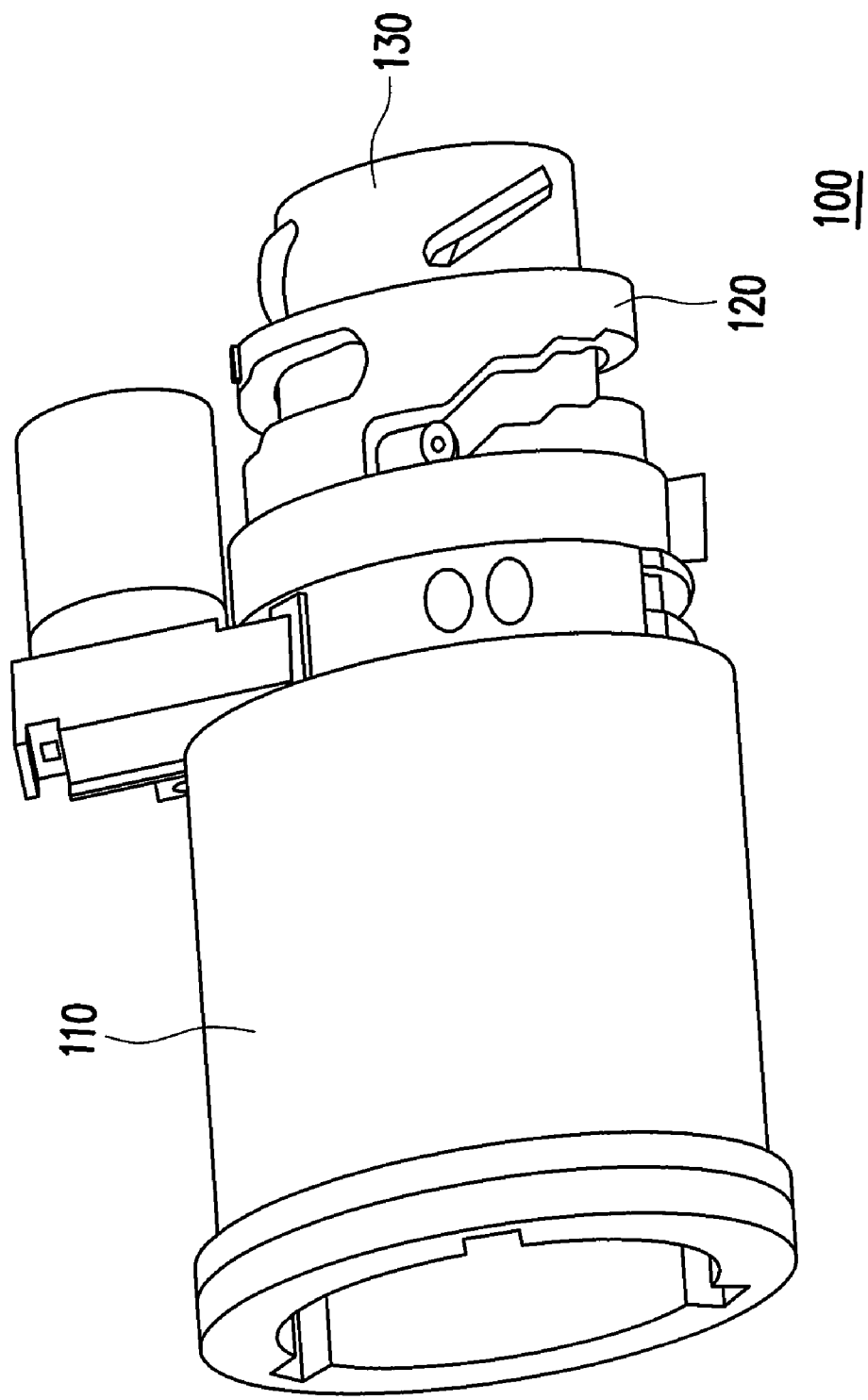
FIG. 1A is a schematic perspective view of a lens structure according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
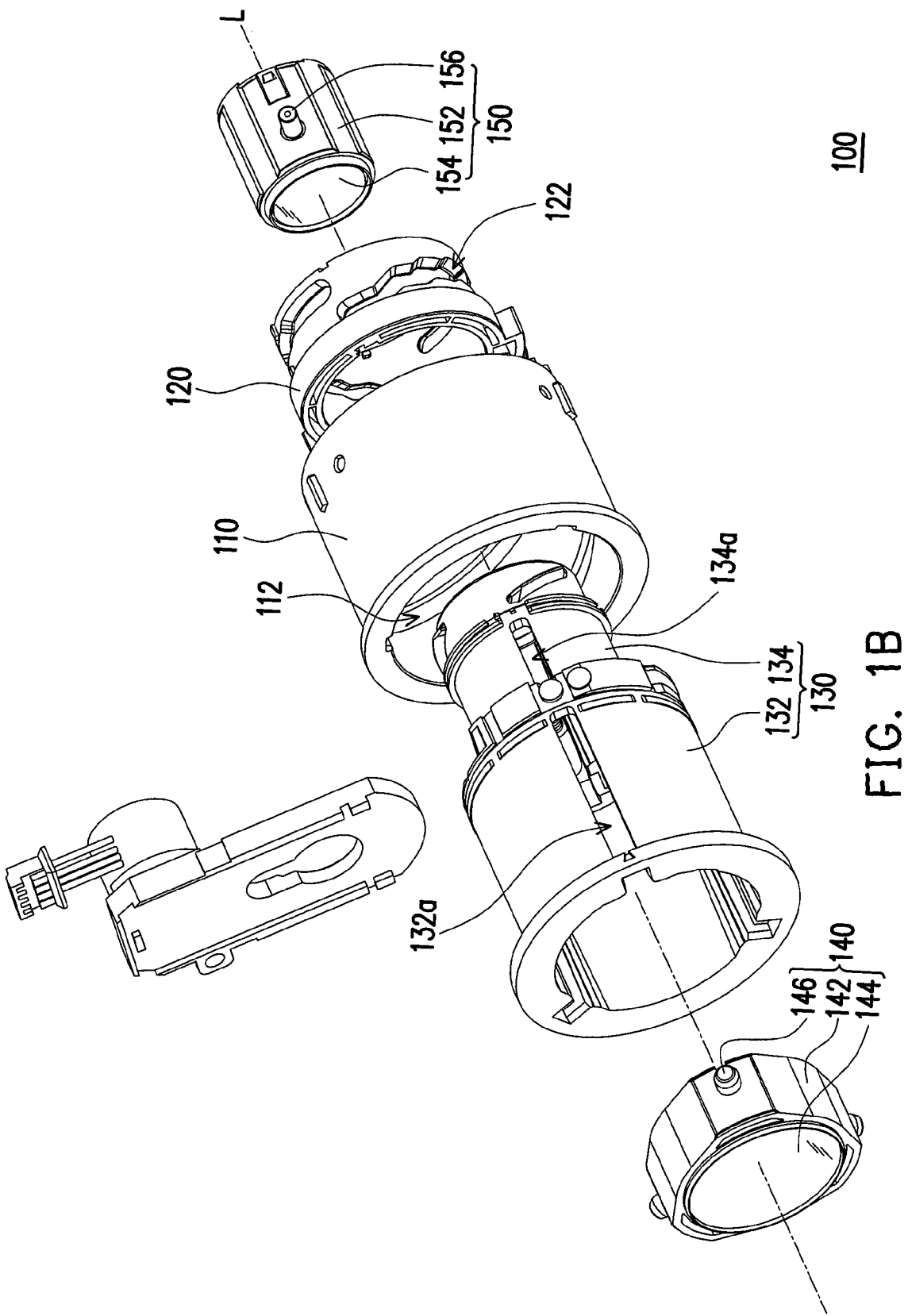
FIG. 1B is a schematic exploded view of the lens structure of FIG. 1A.

FIG. 1A is a schematic perspective view of a lens structure according to an embodiment of the present invention and FIG. 1B is a schematic exploded view of the lens structure of FIG. 1A. Referring to FIGS. 1A and 1B, a lens structure 100 of the embodiment mainly includes a first barrel 110, a second barrel 120, a third barrel 130, a first lens module 140 and a second lens module 150. In the embodiment, a first guiding-groove 112, for example a step guiding-groove, is disposed on the inner surface of the first barrel 110; a second guiding-groove 122, for example a step guiding-groove, is disposed on the second barrel 120, wherein the second barrel 120 is fixed at the first barrel 110 through, for example, screw tightening (in other embodiments, the first barrel 110 and the second barrel 120 can be formed in a single unit).

The third barrel 130 has a first portion 132 and a second portion 134, wherein the external diameter of the first portion 132 is less than the internal diameter of the first barrel 110 and the external diameter of the second portion 134 is less than the internal diameter of the second barrel 120, so that the third barrel 130 is able to be assembled in the combination of the first barrel 110 and the second barrel 120 and goes through the combination along an assembling axis L. The first portion 132 of the third barrel 130 is accommodated in the first barrel 110 and the second portion 134 of the third barrel 130 is accommodated in the second barrel 120. The above-mentioned first guiding-groove 112 and second guiding-groove 122 respectively encircle the first portion 132 and the second portion 134 of the third barrel 130 about the assembling axis L. A plurality of third guiding-grooves 132a and a plurality of fourth guiding-grooves 134a are respectively disposed on the first portion 132 and the second portion 134 of the third barrel 130 along the assembling axis L, and the third guiding-grooves 132a and the fourth guiding-grooves 134a are, for example, linear guiding-grooves.

The first lens module 140 of the embodiment is, for example, a module of front cell lenses used to focus in or focus out the lens structure 100 to obtain a depth of field with focusing so as to capture a sharp image. The second lens module 150 is, for example, a module of rear cell lenses used to zoom in or zoom out an image. The first lens module 140 herein comprises, for example, a first lens barrel 142 and a first set of lenses 144 disposed in the first lens barrel 142. Besides, a plurality of first guiding-portions 146 is disposed on the outer surface of the first lens barrel 142, and the first lens module 140 is connected to the first barrel 110 and the third barrel 130 through the first guiding-portions 146. Similarly, the second lens module 150 herein comprises, for example, a second lens barrel 152 and a second set of lenses 154 disposed in the second lens barrel 152. Besides, a plurality of second guiding-portions 156 is disposed on the outer surface of the second lens barrel 152, and the second lens module 150 is connected to the second barrel 120 and the third barrel 130 through the second guiding-portions 156.

In the foregoing description, the connections of the first barrel 110, the second barrel 120, the third barrel 130, the first lens module 140 and the second lens module 150 are involved; in the following description, the connections between the first lens module 140 and the first barrel 110 and the third barrel 130 and the connections between the second lens module 150 and the second barrel 120 and the third barrel 130 provided by the embodiment would be disclosed in more detail.

The first lens module 140 is disposed through the first portion 132 of the third barrel 130 along the assembling axis L. Specially, the first lens module 140 is disposed in sliding way at the corresponding third guiding-groove 132a through the first guiding-portions 146, where the first guiding-portions 146 are movable under the restriction by, for example, the third guiding-groove 132a (linear guiding-groove), so that the first lens module 140 can be linearly moved in the first portion 132 of the third barrel 130 along the assembling axis L. On the other hand, every first guiding-portion 146 disposed in sliding way in the third guiding-groove 132a would be connected in helically sliding way to the first guiding-groove 112 of the first barrel 110, so that when rotating the first barrel 110 about the assembling axis L, for example, the first guiding-groove 112 having a helical guiding-groove structure drives the first guiding-portions 146 connected in helically sliding way to the first guiding-groove 112 moving in the third guiding-groove 132a along the assembling axis L.

The second lens module 150 is disposed through the second portion 134 of the third barrel 130 along the assembling axis L. Specially, the second lens module 150 is disposed in sliding way at the corresponding fourth guiding-groove 134a through the second guiding-portions 156, where the second guiding-portions 156 are movable under the restriction by, for example, the fourth guiding-groove 134a having a linear guiding-groove structure, so that the second lens module 150 can be linearly moved in the second portion 134 of the third barrel 130 along the assembling axis L. On the other hand, every second guiding-portion 156 disposed in sliding way in the fourth guiding-groove 134a would be connected to the second guiding-groove 122 of the second barrel 120, so that when rotating the second barrel 120 about the assembling axis L, for example, the second guiding-groove 122 having a step guiding-groove structure drives the second guiding-portions 156 connected to the first guiding-groove 112 for moving in the fourth guiding-groove 134a along the assembling axis L.

Figure 2:
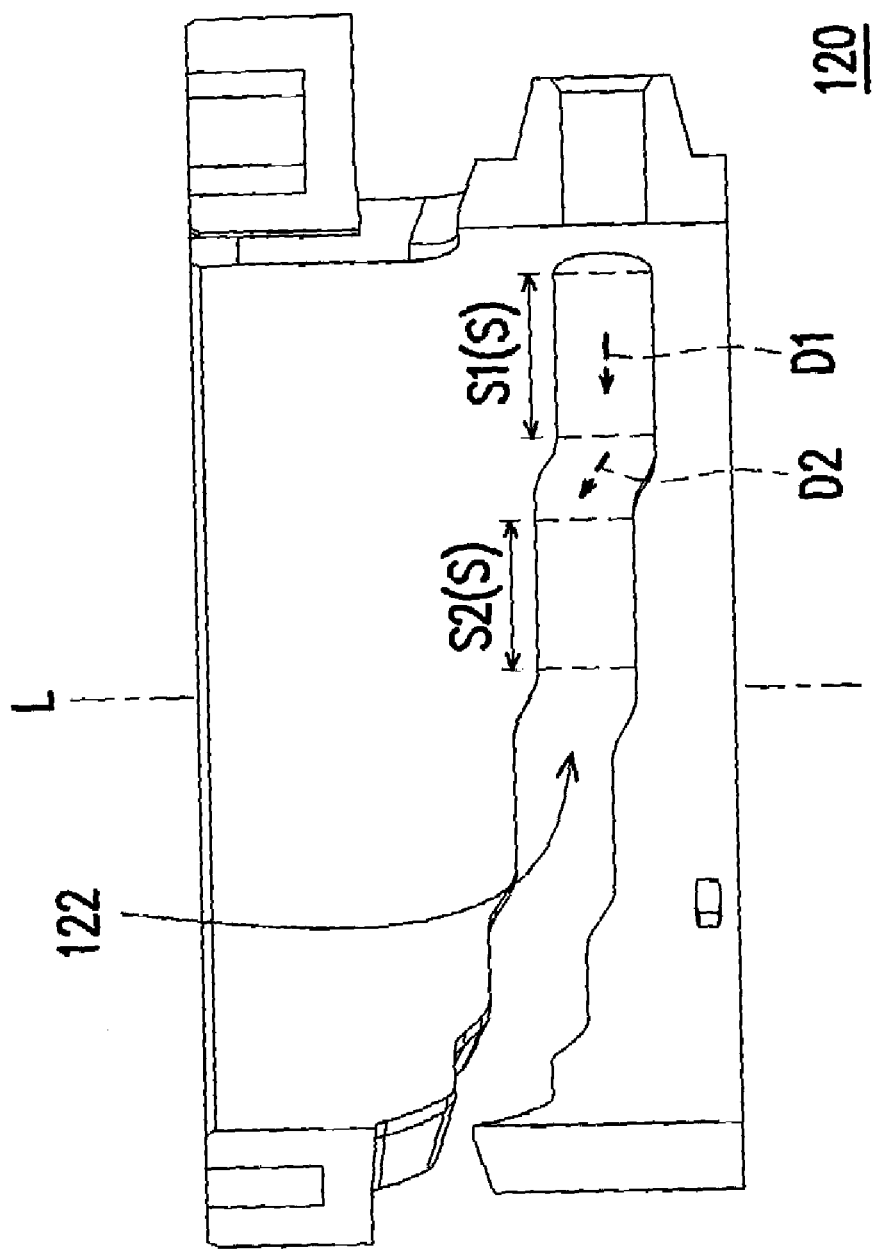
FIG. 2 is a schematic side view of the second barrel of FIG. 1B.

In more detail, the second guiding-groove 122 of the embodiment comprises, for example, a plurality of stepping sections S (referring to FIG. 2, the schematic side view of the second barrel 120 in FIG. 1B). When rotating the second barrel 120 about the assembling axis L, the second guiding-portions 156 moving in each of the stepping sections S does not slide in the corresponding fourth guiding-groove 134a; instead, the second guiding-portions 156 just moving from a stepping section S to another adjacent stepping section S would slide in the corresponding fourth guiding-groove 134a.

Further, when rotating the second barrel 120 about the assembling axis L so as to move the second guiding-portions 156 in a stepping section S1 in the second guiding-groove 122, since the guiding direction D1 of the stepping section S1 is the rotation direction about the assembling axis L, thus, the second guiding-groove 122 is unable to make the second guiding-portions 156 move in the corresponding fourth guiding-groove 134a along the assembling axis L. When rotating the second barrel 120 about the assembling axis L so as to move the second guiding-portions 156 from a stepping section S1 in the second guiding-groove 122 to another adjacent stepping section S2, since the guiding direction D2 for the second guiding-portions 156 to move from the stepping section S1 to the stepping section S2 contains a component parallel to the assembling axis L, the second guiding-groove 122 would drive the second guiding-portions 156 moving in the fourth guiding-groove 134a along the assembling axis L. When the second guiding-portions 156 of the second lens module 150 (rear cell barrel) moves within an area S2 of the second guiding-groove 122 perpendicular to the axis (referring to FIG. 2), it indicates no relative movement between the rear cell optical system and the imaging plane of a CCD sensor in forward-backward direction is produced; instead, the first guiding-portions 146 of the first lens module 140 moves in the first guiding-groove 112 of the first barrel 110 so as to slightly move the first lens module 140 (front cell barrel) and the front cell of optical system relatively to the imaging plane of the CCD sensor in forward-backward direction and thereby to adjust different depths of field under a magnification.

In summary, the lens structure of the present invention needs only one driving device to drive the combination of the first barrel and the second barrel and thereby make the first lens module and the second lens module move to a preset focusing position for focusing and zooming. In comparison with the prior art where two sets of driving devices to drive the first lens module and the second lens module are required, the lens structure of the present invention employs a driving device only for simultaneously adjusting to first lens module and the second lens module to reach a focusing position. As a result, the lens structure of the present invention has lower cost.

On the other hand, in the lens structure of the present invention, during adjusting the focusing position of one of the first lens module and the second lens module through operating the first barrel, the second barrel and the third barrel, the focusing position of the rest one of the first lens module and the second lens module is simultaneously adjusted through the operations, which enables the lens structure to adjust the captured-image magnification and meanwhile to make the image clear. In comparison with the prior art, two driving devices are employed for respectively adjusting the captured-image magnification and the sharpness of the image, the lens structure of the present invention has better focusing efficiency.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens structure, comprising:
   a first barrel, having a first guiding-groove;
   a second barrel, connected to the first barrel, wherein the second barrel has a second guiding-groove;
   a third barrel, suitable to be disposed through the combination of the first barrel and the second barrel along an assembling axis, wherein the third barrel has a first portion and a second portion, wherein a plurality of third guiding-grooves and a plurality of fourth guiding-grooves are respectively disposed on the first portion and the second portion and parallel to the assembling axis, and the first guiding-groove and the second guiding-groove respectively encircle the first portion and the second portion about the assembling axis;
   a first lens module, suitable to be disposed through the first portion along the assembling axis, wherein the first lens module has a plurality of first guiding-portions, and the first guiding-portions are disposed in sliding way in the corresponding third guiding-grooves and connected in helically sliding way into the first guiding-groove; and
   a second lens module, suitable to be disposed through the second portion along the assembling axis, wherein the second lens module has a plurality of second guiding-portions, and the second guiding-portions are disposed in sliding way in the corresponding fourth guiding-grooves and through the second guiding-groove,
   when the combination of the first barrel and the second barrel rotates about the assembling axis, the matches between the first guiding-groove and the first guiding-portions and between the third guiding-grooves and the first guiding-portions move the first lens module along the assembling axis, and the matches between the second guiding-groove and the second guiding-portions and between the fourth guiding-grooves and the second guiding-portions move the second lens module along the assembling axis.

2. The lens structure according to claim 1, wherein the first lens module further comprises a first lens barrel and a first set of lenses, wherein the first set of lenses is disposed in the first lens barrel and the first guiding-portions are disposed on the outer surface of the first lens barrel.

3. The lens structure according to claim 1, wherein the second lens module further comprises a second lens barrel and a second set of lenses, wherein the second set of lenses is disposed in the second lens barrel and the second guiding-portions are disposed on the outer surface of the second lens barrel.

4. The lens structure according to claim 1, wherein the first guiding-groove is a helical guiding-groove disposed on the inner surface of the first barrel.

5. The lens structure according to claim 1, wherein the second guiding-groove is a step guiding-groove.

6. The lens structure according to claim 1, wherein the third guiding-groove and the fourth guiding-groove are linear guiding-grooves.

7. The lens structure according to claim 1, wherein when the combination of the first barrel and the second barrel rotates about the assembling axis, the first guiding-groove makes the first guiding-portions slide along the assembling axis in the third guiding-grooves and makes the second guiding-portions slide along the assembling axis in the fourth guiding-grooves.

8. The lens structure according to claim 1, wherein the second guiding-groove has a plurality of stepping sections; when the second barrel rotates about the assembling axis, the second guiding-portion moveable within one of the stepping sections does not slide in the corresponding fourth guiding-groove, but the second guiding-portion moving from a stepping section to another adjacent stepping section slides in the corresponding fourth guiding-groove.

9. The lens structure according to claim 1, wherein the first barrel and the second barrel are formed in a single unit.

10. The lens structure according to claim 1, wherein the first lens module is a front cell of lenses and the second barrel is a rear cell of lenses.

* * * * *